United States Patent
Vogel et al.

[11] Patent Number: 5,921,588
[45] Date of Patent: Jul. 13, 1999

[54] PUSH-IN PIPE COUPLING

[75] Inventors: Rolf Vogel, Schriesheim; Wolfgang Sichler; Reinhold Scholl, both of Mannheim, all of Germany

[73] Assignee: Friatec Aktiengesellschaft, Mannheim, Germany

[21] Appl. No.: 08/884,671

[22] Filed: Jun. 27, 1997

[30] Foreign Application Priority Data

Jun. 27, 1996 [DE] Germany .......................... 196 25 687

[51] Int. Cl.[6] ............................................... F16L 55/00
[52] U.S. Cl. .......................... 285/23; 285/93; 285/322; 285/906
[58] Field of Search ............................. 285/93, 322, 323, 285/391, 23, 906

[56] References Cited

U.S. PATENT DOCUMENTS

| | | | |
|---|---|---|---|
| 887,864 | 5/1908 | Steese | 285/391 X |
| 3,743,326 | 7/1973 | Courtot et al. | |
| 4,067,534 | 1/1978 | Frey | |
| 4,138,145 | 2/1979 | Lawrence | 285/323 X |
| 4,364,587 | 12/1982 | Samford | 285/93 X |
| 4,406,485 | 9/1983 | Giebeler | 285/391 |
| 5,046,763 | 9/1991 | Mortucci et al. | 285/322 X |
| 5,593,186 | 1/1997 | Harris | 285/322 X |

FOREIGN PATENT DOCUMENTS

| | | |
|---|---|---|
| 587131 | 9/1993 | European Pat. Off. |
| 1071751 | 9/1954 | France ......................... 285/93 |
| 1907474 | 9/1969 | Germany |
| 3112255 | 4/1982 | Germany |
| G 9308181 U | 6/1994 | Germany |
| 4304241 | 8/1994 | Germany |

*Primary Examiner*—Dave W. Arola
*Attorney, Agent, or Firm*—Evenson, McKeown, Edwards & Lenahan, P.L.L.C.

[57] ABSTRACT

A push-in coupling for pipes contains a sleeve body (2) and a holding means, especially with a clamping body (6), for connecting a pipe end (3, 4) to the sleeve body (2). This push-in coupling permits proper handling with little effort during assembly, and insofar as possible prevents the danger of faulty assembly. A sliding body (50) is disposed within the sleeve body (2), the sliding body (50) being made independently of the holding means. The sliding body (50) contains a striker (52) which upon insertion of the pipe end (3, 4) is pushed over an edge (60), and upon reaching a given depth of insertion of the pipe end (3, 4) strikes against a surface (62) producing a detectable signal such as an acoustical signal and/or a vibration signal.

28 Claims, 4 Drawing Sheets

5,921,588

PUSH-IN PIPE COUPLING

BACKGROUND OF THE INVENTION

The invention relates to a push-in coupling for pipes comprising a sleeve and a holding device which contains a clamping ring for joining a pipe end to the sleeve.

European patent application No. EP 587,131 discloses a push-in coupling of this kind, which has a coupling sleeve, a holding means in the form of a clamping device, and an operating device. The coupling sleeve is configured as a dual sleeve, so that with this push-in coupling the ends of two plastic pipes can be joined together with the two clamping devices. The holding means contains a clamping ring which has externally a clamping taper and internally at least one clamping rib which can be brought into engagement with the pipe end. By means of a sleeve nut which can be threaded onto the coupling sleeve the opposite taper can be gripped by the clamping ring. Also, a sealing ring is disposed in the coupling sleeve. When applying the coupling care must be taken that the pipe end is inserted far enough into the coupling sleeve so that the clamping ring and likewise the sealing ring can perform their functions. There is a danger, however, that as a result of incomplete insertion of the pipe end into the push-in coupling, the connection will fail to hold or will be defective.

Published German Patent Application No. DE 3,112,255 discloses a quick coupling for pipes having a holding system which comprises an axially displaceable hold-back means. The hold-back means contains axial slits and is disposed partially within a rigid ring with a circular rib. The hold-back element consists of resilient-elastic material and has a rib directed radially outward, as well as a conical surface at the front end, which corresponds with a taper of an intermediate element. When a pipe is inserted, first the hold-back means and the surrounding ring with the circular rib are moved in the axial direction until the ring comes into contact with a bottom of the sleeve body. As insertion of the pipe continues, the radial ring of the hold-back means moves past the circular rib, while the resistance to insertion increases and the hold-back means is pressed radially against the outside surface of the pipe. If the rib of the hold-back means is all the way past the circular rib of the ring, the rib enters into an annular groove in the ring, while the given resistance to the insertion movement suddenly ceases. Thereupon the pipe together with the hold-back means and the snapped-in ring is moved forward contrary to the insertion movement until the conical surface of the hold-back means is tightened against the cone of the intermediate element. The specification and the adjustment of the force of resistance requires a not inconsiderable production difficulty involving close tolerances, especially in the hold-back means and of the ring with the circular rib. Close limits must also be observed for the outside diameter of the pipes, since otherwise the teeth of the hold-back means are forced only partially into the pipe and the pipe can be pulled back out of the coupling. The prior-art coupling furthermore permits relative axial movements of the pipe with respect to the coupling, and foreign bodies can come within the reach of a gasket placed between a nut and the intermediate element and there is a danger of leakage of the medium under pressure from the pipe.

Furthermore, German Utility Model No. DE-U 93 08 181 discloses a connection fitting for pipes which has a connecting means that can be fastened to a pipe end and an annular groove for a sealing ring. A pilot ring which can be moved by the pipe end past the sealing ring during assembly is present, which has a surface for contact by an end surface of the pipe end. When the pipe end is inserted, the pilot ring has to be pushed by the sealing ring, with the need to overcome increased resistance to insertion. When the pilot ring has been pushed completely through the sealing ring, the resistance decreases markedly. Damage to the sealing ring by the pipe end is said to be prevented by the pilot ring without the need to chamfer the pipe end.

A push-in coupling for pipes, hoses or similar round bodies also is disclosed in Published German Patent Application No. DE 4,304,241, which comprises a holding means and at least one sealing ring in a receiving sleeve. The holding means contains, radially within it, a slotted or fan-like holding disk whose tongues sloping radially inward toward the sleeve bottom serve for clamping the exterior surface of the inserted pipe end. In this push-in coupling also the danger is that the pipe end will not be inserted far enough and the required connection will not be properly established.

SUMMARY OF THE INVENTION

It is an aim of the invention to provide an improved push-in pipe coupling with which a connection to at least one pipe end can be established with little difficulty and great reliability.

Another aim of the invention is to provide a push-in coupling which permits simple and practical handling during assembly.

A further aim of the invention is to provide a push-in coupling which can be manufactured at low production cost and which assures that when the connection is made, the parts essential to operation, such as especially the seal, the clamping ring or the like, will function properly.

These and other aims have been achieved in accordance with the present invention by providing a push-in pipe coupling for joining a pipe end to a sleeve, said coupling comprising the sleeve, a holding device which includes a clamping ring, and an axially displaceable sliding body which is configured independently of the holding device, the sliding body having a striker which, when the pipe end is inserted, is pushed over an edge and upon reaching a given depth of insertion of the pipe end strikes against a surface thereby producing a detectable signal.

The push-in coupling of the invention is characterized by a functional design and assures a reliably operating and long-lasting connection. A sliding body having a striking means is provided which can be displaced axially by the inserted pipe end. The striking means is preferably in the form of a radially movable tongue, and when the pipe reaches a predetermined specific depth of insertion it collides with an associated strike surface. When it collides a signal is produced which can be called a click, and which is easily perceivable by the installer without additional aid. The signal produced by the collision can be perceived by the installer as an acoustical signal, especially, and/or the signal can be felt by the hand itself as a thump or vibration.

When the pipe end is inserted, the radially acting tongue is caused to pass over an end surface which extends radially inward and is thereby biased radially, and after it passes over an edge and the pipe reaches the predetermined insertion depth, the tongue strikes against the end surface producing the vibratory signal which is heard as a noise or felt by the hand. The tongue and the said end surface are adapted or matched to one another such that no additional devices for amplifying the collision and/or vibratory signal are necessary. The radial biasing of the striking means or tongue requires virtually no additional force, and the insertion movement of the pipe can be performed and completed largely without hindrance. It is not necessary for the striking means to come in contact with the exterior surface of the pipe when it is biased, and after passing over the said edge and after the outward radial flexure of the striking means, the latter is entirely out of contact with the exterior surface of the pipe. After the acoustical or vibratory signal occurs, the installer can end the insertion movement, since he knows with great certainty that the connection is now properly made.

The sliding body is preferably configured as a ring with a surface for contact with an axial end face of the pipe to be inserted. The striking means is preferably an integral component of the sliding body and is a kind of resilient tongue which, when the required depth of insertion is reached, is flexed outwardly, preferably in the radial direction, over a step, a nose or the like, and then snaps back against the associated strike surface to produce the vibratory signal or click. The holding means is independent of the striking means according to the invention, and preferably comprises a clamping ring with a conical exterior surface. The clamping ring is preferably fixed in the required manner with respect to the sleeve body by means of a cap. The clamping ring and the sliding body are separate components independent of one another; the clamping ring retains its axial position in the sleeve body when the pipe end is inserted, while the sliding body is shifted axially with respect to the sleeve body by the end of the pipe. After complete insertion is signaled by the striking means, the cap is installed on the sleeve body by slipping it on axially or screwing it on, so that the clamping ring is clamped against the exterior surface of the pipe end. By means of the clamping ring a sealing ring is also compressed in an advantageous manner relative to the exterior surface of the pipe end and the sleeve body. When the pipe end is inserted, the surface and edge associated with the striking means substantially retain their axial positions in the sleeve body, and only the sliding body is displaced axially by the pipe end. Preferably the sliding body is arranged as a separate component axially spaced away from the holding means, particularly from its clamping ring.

Further forms and special embodiments of the invention are set out in the following description.

BRIEF DESCRIPTION OF THE DRAWINGS

The invention will be described in further detail hereinafter with reference to illustrative preferred embodiments depicted in the accompanying drawings in which.

DETAILED DESCRIPTION OF PREFERRED EMBODIMENTS

Figure 1:
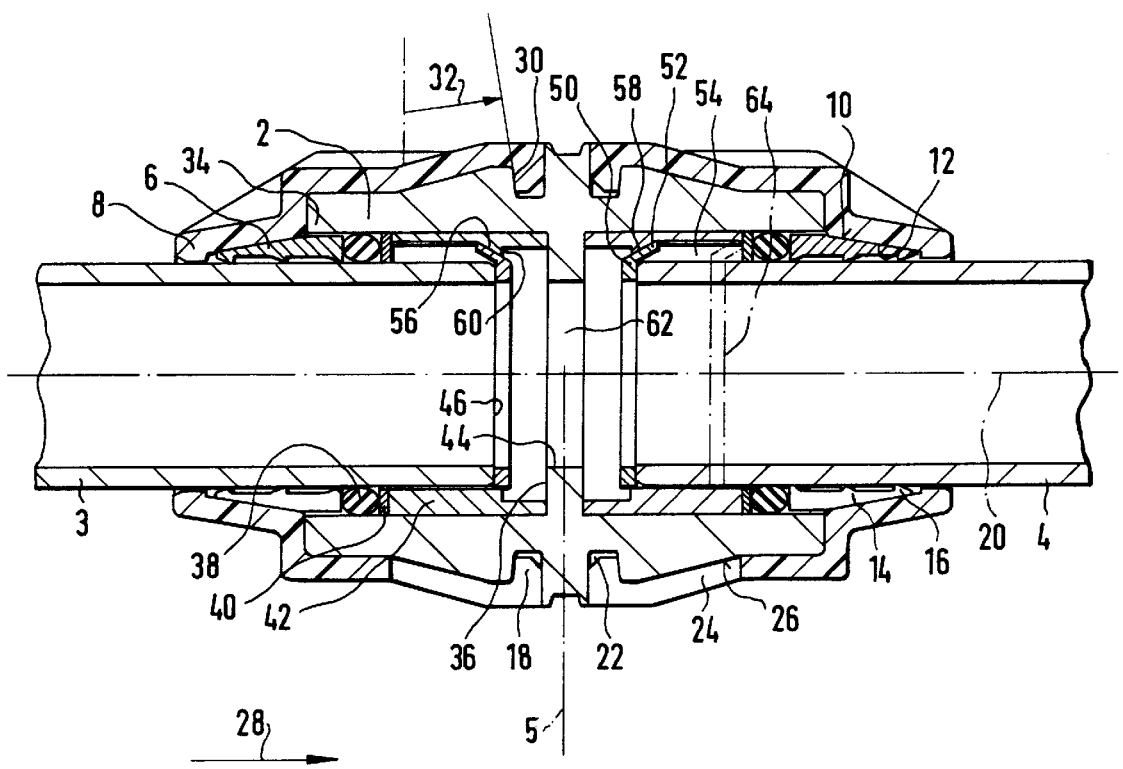
FIG. 1 is a sectional view taken in an axial plane through a push-in pipe coupling according to the invention which is configured as a double push-in pipe coupling.

FIG. 1 shows in longitudinal section a push-in pipe coupling with a sleeve 2 which hereinafter is also called a housing, and in which tube ends 3 and 4 are partially inserted from each end. The push-in pipe coupling or sleeve is configured as a double sleeve which is depicted as being in mirror symmetry about a center plane 5. In the scope of the invention, the push-in coupling can also be designed for only one pipe end, and especially as a component of a fitting or the like. Insofar as explanations are given hereinafter for the left or right portion of the double sleeve, such explanations apply also to the other portion. The individual components of the left or right portion of the double sleeve are of identical configuration and are installed in the push-in pipe coupling with rotation with respect to the center plane, only the sleeve being the same for both portions.

In the housing or sleeve 2 there is a clamping ring 6 which is partially also surrounded by a fastener body 8. The fastener body 8 is configured expediently as a cap or hood which extends over a good part of the sleeve 2. In the case of the double sleeve shown in the drawing, each of the two fastener bodies or caps 8 almost completely overlaps their related portions of the sleeve 2 and of the clamping ring. The clamping ring 6 has a tapered exterior surface 10 against which lies a corresponding tapered internal surface 12 of the fastening body 8. The clamping ring 6 is not entirely inside of the sleeve, but at least its tapered outer surface 10 protrudes from the sleeve into the portion of the fastener body 8 in which the tapered inside surface 12 is provided. The clamping ring 6 contains a preferably axial slit 14 and has on its inside surface teeth 16 which are designed to penetrate into the outside surface of the tubes 3 and 4. The fastener body 8 is configured as a cap partially overlapping the sleeve 2. The fastener body or cap 8 contains at its end facing the center plane 5 catch means 18 which are pointed radially inward toward the axis 20 and engage in a circumferential groove 22 on the sleeve. The cap 8 contains a number of longitudinal slots 24 distributed over the circumference, which extend over a portion of the total length of the cap 8 from the catch means 18. The cap 8 consists of a sufficiently spring-elastic material, especially plastic, and the arms with the catch means 18, formed by the longitudinal slots 24, can be flexed radially outward to a given extent to produce the junction with the sleeve. The sleeve 2 has for this purpose a conical outside surface 26 with its apex pointing away from the central plane 5.

To produce the connection between the sleeve 2 and the cap 8, the latter is pushed axially onto the sleeve 2 in the direction of the arrow 28 until the catch means 18 engage the circumferential groove 22. The wall 30 of the snap-catch groove or circumferential groove 22 does not lie exactly in a radial plane but is tilted or disposed with a radius 32, while the center point of this torus or circular surface faces the free end 34 of the sleeve 2. This assures in an advantageous manner that the cap 8 is drawn onto the sleeve 2 in the axial direction, i.e., in the direction of the arrow 28. Furthermore, after the catch means 18 has been snapped into the circumferential groove 22, escape is prevented.

Although the connection between the fastening body and the cap, which is no longer releasable after it has been made, has proven to be very desirable, other means can be provided for holding the cap on the sleeve 2, such as a releasable screw connection or a non-releasable weld, which are mentioned only by way of example. Furthermore, the holding device with clamping ring and cap constitute no restriction of the invention. Other designs of the holding system, i.e., for the joining of the inserted tube end 3, 4, to the sleeve 2, can be provided.

In the axial direction toward the face 36 of the sleeve, the clamping ring 6 is adjoined inside of the sleeve 2 by a sealing ring 38 in contact with a thrust ring 40. Then follows a sleeve 42, which is arranged between the thrust ring 40 and the sleeve face 36. In the double sleeve here depicted, the sleeve face 36 is formed by an axial surface of a ring 44 disposed in the area of the central plane 5. Of course, if the sleeve design is in one piece the sleeve 42 is in contact with and supported by a surface of the fitting, an armature or the like that is comparable with the sleeve face 36. The explained components are coordinated with one another such that, after the tube end 3, 4, has been inserted into the sleeve 2, the sealing ring 38 is in contact, with the necessary radial bias, with the external surface of the tube end 3, 4, for the purpose of sealing. The sealing ring 38 is disposed axially between clamping ring 6 and sleeve 42 and the thrust ring 40. The striker 52 and/or thrust ring 40 are fixed axially, preferably on the sleeve face 36, such that, when the fastening body 8 is displaced as described, the clamping ring 6 is driven axially toward the supporting ring 40 and/or the sleeve 42, and thus the sealing ring 38 is tightly held. It is expressly stated that, when the tube end is inserted, the thrust ring 40 and/or the sleeve 42 do not perform any axial movement and are axially secured in the sleeve against the insertion movement.

As shown in the drawing, the tube end 3, 4, is not yet fully inserted into the sleeve 2. The axial end face 46 of the tube end 3 is lying against a sliding body 50 which is independent of the holding device and its clamping ring and is at a distance axially therefrom, and it also has at least one striker 52. It is important to note that the sliding body 50 is independent of the holding device which, in the embodiment shown here contains the clamping body 6. The sliding body 50 is able to move separately and independently of the holding device when the tube end is inserted. Preferably, three such striking means are provided, which are distributed over the circumference of the sliding body 50, and which are preferably configured as radially movable tongues. The striking means 52 is disposed and/or guided in an axial groove or recess 54 of sleeve 42. When the tube end 3 is in the position represented, the sliding body 50 has already been shifted axially so far that the outside surface 56 of the striking means 52, which is at an angle to the longitudinal axis 20, is in contact with an end face 56 of the longitudinal groove 54. Due to the resilience of the striking means 52, the latter is forced radially inward as the tube end 2 continues to enter, until its free end has been pushed over an edge 60. Then the striking means 52 snaps over the edge 60 and then strikes against a surface 61 in the interior of the sleeve 42. When the free end of the striking means 52 strikes against this abutment surface 62, a signal is produced according to the invention, which is perceived acoustically and/or as a vibration manually by the operator, and can also be called a click or clunk. The operator is thus informed of the complete and proper insertion of the tube end 3 into the push-in pipe coupling. The inner surface of the edge 60, on the one hand, and the greater inside diameter of the abutment surface 62 on the other, are so adapted to one another that the acoustical signal is clearly perceived by the operator outside of the push-in pipe coupling.

The position of the sliding body 50 before the tube end 3 is inserted is indicated in broken lines. In this position, the sliding body 50, as it will be described below, is joined to the sleeve 42 such that any unintentional escape of the sliding body is thus prevented. The junction between the sliding body 50 and the sleeve 42 is designed such that, when the tube end 3 is inserted, it is released by a comparatively small force, so that then the sliding body 50 can be displaced axially in the direction of arrow 28 in the manner explained.

Figure 2:
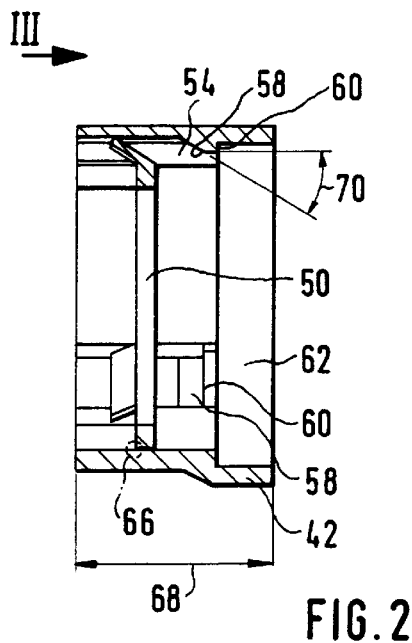
FIG. 2 is a section through the sliding body still joined to the sleeve.
Figure 3:
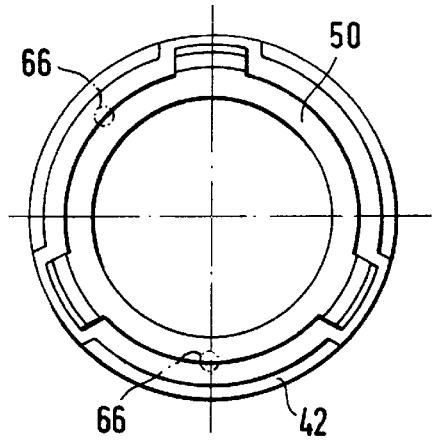
FIG. 3 is an end view of the sleeve and the sliding body viewed in the direction of arrow III in FIG. 2.

FIGS. 2 and 3 show the sliding body 50 in the position joined to the sleeve 42. Between the sleeve 42 and the sliding body 50 there is at least one small spur 66. The sleeve 42 and the sliding body 50 are preferably made in one piece together with the at least one spur 66. Three such spurs 66 are expediently provided between the inner surface of the sleeve 42 and the outer surface of the sliding body 50, and are distributed over the circumference. These spurs 66 are of such dimensions that they break off under the effect of a predetermined axial force and thus the sliding body 50 becomes displaceable in the sleeve 42. The spurs 66 are preferably not arranged in the area of the grooves 54 for the striking means or tongues 52, but in the area between grooves 54 adjacent one another in the circumferential direction.

In FIG. 3 the three grooves 54 for the three striking means or tongues 52 can easily be seen. Furthermore, the axial grooves 54 extend over only a part of the total length 68 of the sleeve 42, which is continuous over the circumference at the counter abutment surface 62. The longitudinal groove 54 is followed in the direction toward the counter abutment surface 62 by the end surface 58 which is arranged at a given angle 70 and along which, after the sliding body 50 breaks off, the striking means 52 slides as the tube end is further inserted, until it snaps over the edge 60 and then opens radially outward and thus abuts against the counter abutment surface 62 in the manner described above.

Figure 5:
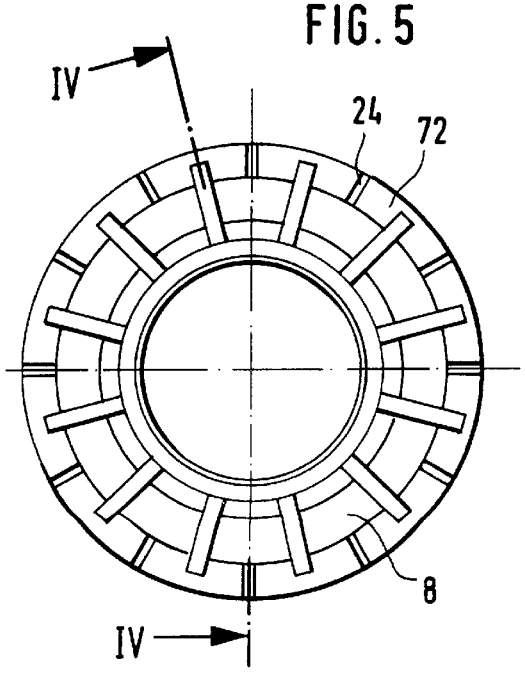
FIG. 5 is a view of the cap seen in the direction of arrow V in FIG. 4.
Figure 4:
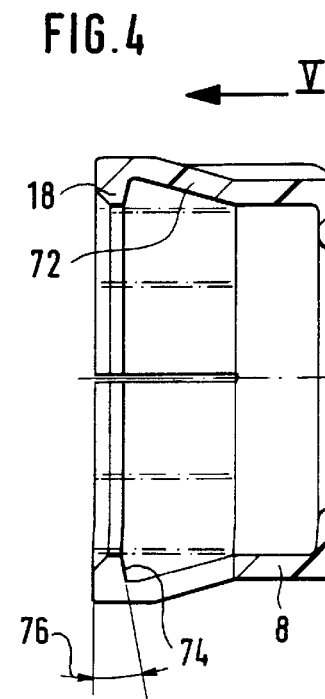
FIG. 4 is an axial section through the cap.

FIGS. 4 and 5 show the fastening body configured as the cap 8 with the already-mentioned arms 72 for the catch means 18. Uniformly distributed over the circumference are a number—in this case twelve—of such arms 72 with the catch means 18 pointing radially inward. The inner abutment surfaces 74 of the catch means 18 are at an angle 76 with respect to the longitudinal axis, or they are provided with a radius. This radius or inclination is coordinated with the radius or slope or inclination of the side wall of the circumferential groove in the sleeve as explained in connection with FIG. 1.

Although the arrangement of the sleeve 42 has proven practical, the sleeve can be eliminated or integrated into the sleeve in another embodiment of the invention. In this embodiment, and thus mainly the groove 54, the edge 60 as well as the counter-abutment surface 62, are integral components of the sleeve 2 within the scope of the invention.

Figure 6:
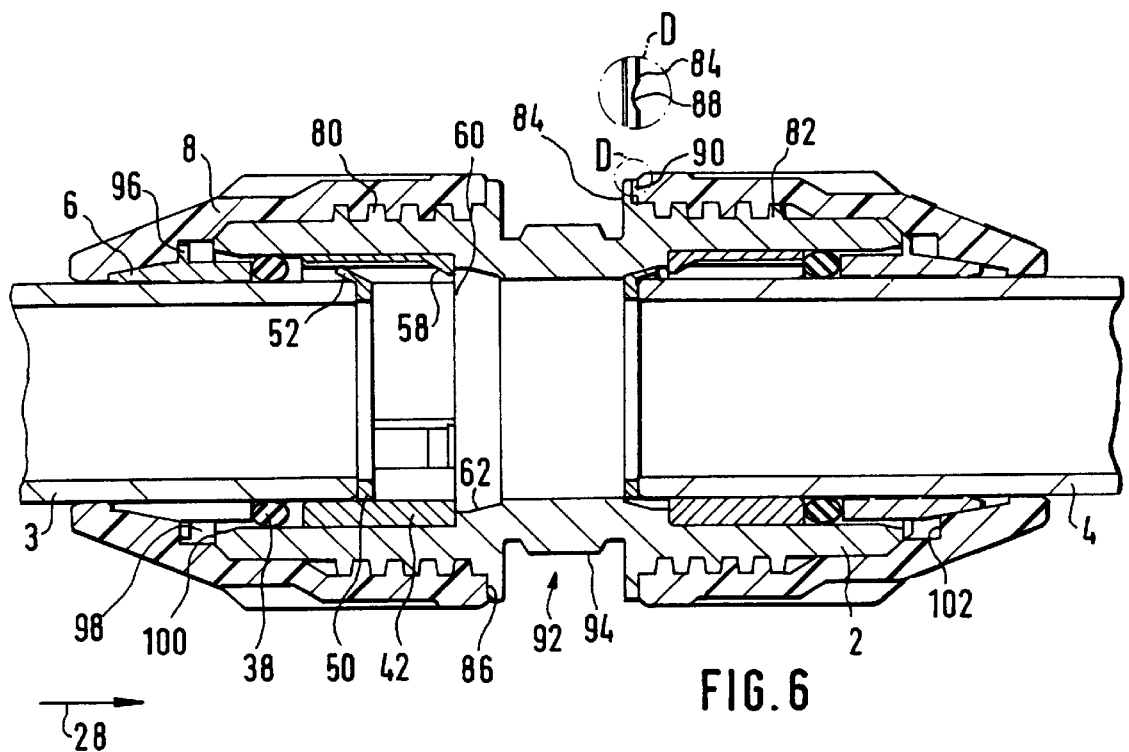
FIG. 6 is a section taken in an axial plane through an alternate embodiment of a push-in pipe coupling according to the invention.

FIG. 6 shows an alternative embodiment of the invention, in which the cap 8 is removably fastened to the sleeve 2. The cap or the fastening body is provided with an internal thread 80 and the sleeve 2 a matching external thread 82. The external thread 82 and likewise the internal thread 80 do not extend over the entire circumference, but are divided into segments with spaces between them such that the cap does not have to be screwed on over the entire length of the threads, but needs only to be rotated through a small angle to create the attachment to the sleeve. Due to the division of the threads 80 and 82 into segments, as will be explained in detail below, a quick connection is created which assures that the cap 8 will be fastened reliably on the sleeve 2 with little loss of time.

The sleeve 2 advantageously has an abutment 84 for the axial face 86 of the cap 8. The abutment 84 contains a detent groove 88 running in the radial direction. The detail represented at the upper right in FIG. 6 shows this radial detent groove 88 in a position rotated 90° out of the plane of drawing. The cap contains in its axial end face 86 a corresponding detent 90 which, when the cap reaches the predetermined rotational position of the cap 8 with respect to the sleeve 2, engages in the detent groove 88. The sleeve 2 contains in the center an annular recess 92 whose bottom contains at least one surface for engagement by a tool and is configured preferably as an octagon for a fork wrench. With the tool or fork wrench, an operator can hold the sleeve easily as the cap is being threaded on.

In this embodiment, the clamping ring 6 contains an abutment 96 which limits the axial movement of the clamping ring 6 as the tube end 3 is inserted, so that during the insertion of the tube end 3 the sealing ring 38 will not be additionally compressed and the insertion force required will remain virtually unchanged. Without the abutment 96, when the tube end 3 is inserted the clamping ring would be driven in the direction of insertion indicated by the arrow 28, until the sealing ring 38 comes in contact with the sleeve 42. Since the clamping ring 6 rests tightly on the external surface of the pipe end 3, the resilient sealing ring 38 would become compressed, resulting in radial pressure on the external surface and an increase in resistance to the insertion. As a result of the abutment 96, the locking action of the clamping ring 6 is performed in an especially practical manner because, when the insertion takes place, there is no increase of the bias of the sealing ring 38 and thus any increase in the required insertion force is avoided. For the abutment 96, which is configured as a radial lug, ring, segment or the like, a free space 98 is provided, the axial length of which is adapted to the allowable movement of the clamping ring 6. The free space 98 is provided expediently between an axial end face 100 of the sleeve 2 and a bead or step 102 inside of the cap 8. The clamping ring 6 with the abutment 96 can thus be installed and used without problems.

In the left half of FIG. 6 the pipe end 3 is shown in the position in which during its insertion it reaches the sliding body 50. As explained in connection with the first embodiment in FIG. 2, in this position the sliding body 50 is still connected to the sleeve 42 by a small spur of material. As insertion of the pipe end 3 continues this connection is broken and the sliding body 50 is driven to the right in the direction of arrow 28. Thus the striking means or tongue 52 arrives at the end face 58 of the sleeve 42, and as insertion continues it is forced radially inward. Then the striking means 52 snaps over the edge 60 and then strikes against the abutment surface 62 which in this special embodiment is a component of the sleeve 2. In accordance with the invention, the surface lies on a greater radius than the edge 60, and as the tongue or striking means 52 snaps back radially outward, the signal is produced which is heard by an operator and/or is felt by the hand as a vibration.

Figure 7:
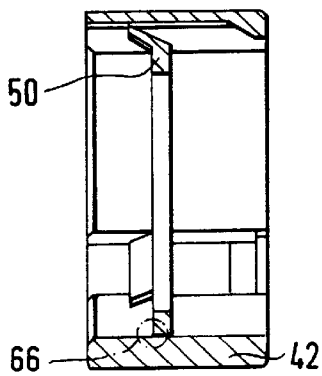
FIG. 7 is an axial section of a sleeve with a sliding body of the embodiment of FIG. 6.
Figure 8:
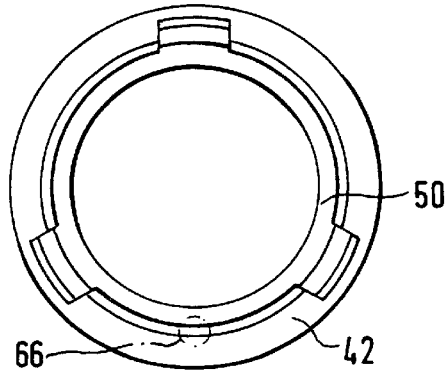
FIG. 8 is an end view of the sleeve with the sliding body according to FIG. 6.

FIGS. 7 and 8 show the sleeve 42, in which the sliding body 50 is still held fast by the spur 66. In comparison with the embodiment explained in FIG. 2, the sleeve 42 has less axial length, since the above-explained abutment surface is not a component of the sleeve, but lies inside of the sleeve.

Figure 9:
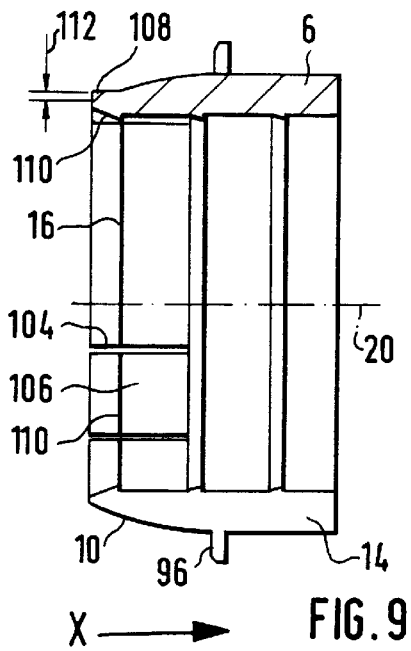
FIG. 9 is an axial section of the clamping ring of the embodiment of FIG. 6.
Figure 10:
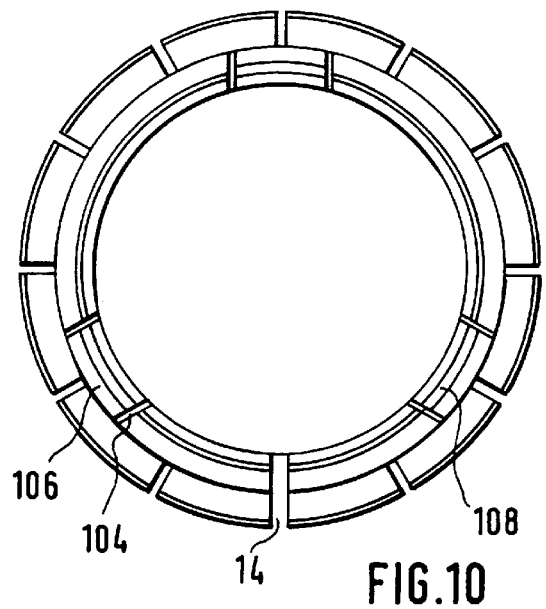
FIG. 10 is an elevational view of the clamping ring of the embodiment of FIG. 6.

FIGS. 9 and 10 show the clamping ring 6 with the abutment 96. As it can be seen in FIG. 10, the abutment 96 is divided into a number of segments. The clamping ring 6 furthermore contains the above-mentioned conical exterior surface 10, which is brought into contact with the corresponding conical inside surface of the fastening body or cap. In this embodiment the clamping ring 6 is provided in the area of the conical exterior surface 10 with slots 104 to create at least one radially flexible tongue 106. The at least one tongue 106 has a nosing 108 by which, when the cap is screwed on, the tongue 106 is pressed further inward radially toward the longitudinal axis 20 than are the other areas of the clamping ring 6 provided with the slit 14. The gripping tab 110 of tongue 106 is thus forced more strongly into the exterior surface of the inserted tube end than are the other portions of the tooth 16. This results in a local increase of the surface pressure between the gripping tab 110 and the tube and thereby a considerable improvement of the holding force is assured. The push-in pipe coupling thus configured assures a lasting, reliably acting and positive junction even in the case of very high internal pressures in a conduit system. The nose 108 projects beyond the conical exterior surface 10 of the clamping ring 6 at a given height 112. The height 112 of the nose and the size of the clamping tongue 106 are coordinated with one another such that a secure positive fit between the clamping ring 6 and the inserted tube end is assured. As can be seen in FIG. 10, three radially flexible tongues 106 advantageously are provided, which extend preferably over an angle of 20° to 40°, especially of an order of magnitude of 30° with respect to the longitudinal axis 20.

Figure 12:
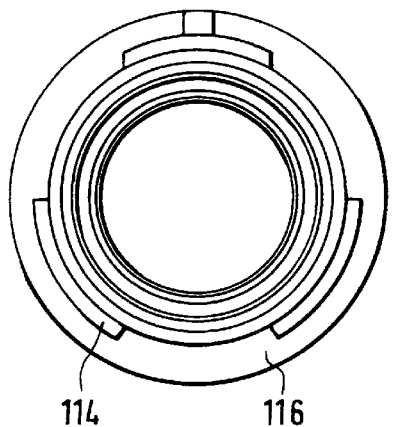
FIG. 12 is an elevational view of the sleeve of the embodiment of FIG. 6.
Figure 11:
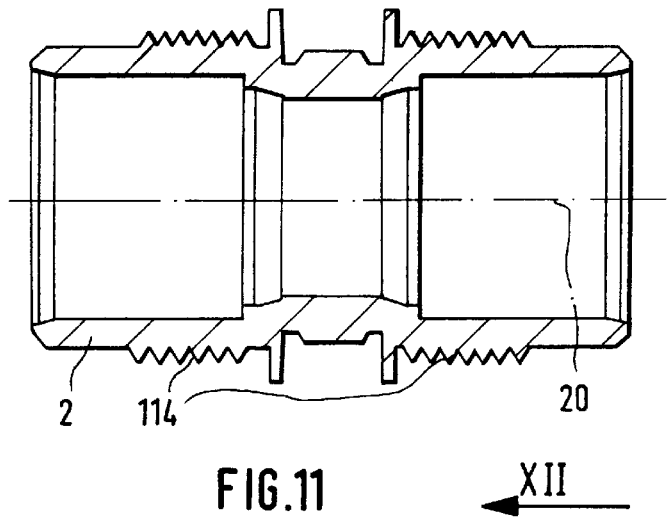
FIG. 11 is an axial section of the sleeve of the embodiment of FIG. 6.

FIG. 11 shows in an axial section the sleeve 2 of the embodiment according to FIG. 6, and FIG. 12 shows an axial elevation in viewing direction XII of FIG. 11. The three thread segments 114 of the external thread and the gaps 116 are easily seen in FIG. 12. In FIG. 11 the lower threaded segments 114 and the gaps 116 extend in each case over an angle of approximately 60°. Also the associated internal thread of the cap is divided accordingly into threaded segments and gaps. To produce the junction the cap is first slipped axially onto the sleeve 2 such that the threaded segments of the cap engage the gaps in the sleeve 2 and vice-versa. Then the cap is to be rotated only over a given angle, especially only about 60°, such that the thread segments of the cap become engaged in the thread segments of the sleeve 2. By means of the detent explained above, which enters into the detent groove of the sleeve, the defined rotational angular position of the cap is assured for a lasting and reliably operating lock on the sleeve 2.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A push-in pipe coupling comprising:

a first sleeve into which an end of a pipe is to be inserted, a fastener body configured to extend over a part of the first sleeve, a clamping ring partially disposed inside of said sleeve and partially disposed inside of said fastener body, a second sleeve secured within said first sleeve and in which an edge is defined, an axially displaceable sliding body which is configured independently of the clamping ring, said sliding body having a striker which, when said end of the pipe is inserted into the coupling, is pushed past said edge defined in the second sleeve thereby producing a detectable signal, insertion movement of the end of the pipe ending upon reaching a given depth of insertion at which said detectable signal is produced.

2. A push-in pipe coupling according to claim 1, wherein said detectable signal is an acoustical signal.

3. A push-in pipe coupling according to claim 1, wherein the sliding body has an annular shape and said striker is at least one radially outwardly projecting striker.

4. A push-in pipe coupling according to claim 3, wherein the striker is one of three strikers.

5. A push-in pipe coupling according to claim 1, wherein the sliding body is disposed at an axial distance away from the clamping ring.

6. A push-in pipe coupling according to claim 1, wherein the striker is associated with a groove in said second sleeve terminating in an end surface and upon being displaced by the pipe end moves past said end surface of the groove to produce said signal.

7. A push-in pipe coupling according to claim 6, wherein said end surface is inclined at a given angle.

8. A push-in pipe coupling according to claim 1, wherein said second sleeve has a counter abutment surface and the edge has a smaller diameter than a counter abutment surface of said second sleeve against which said striker strikes when said striker is pushed past said edge.

9. A push-in pipe coupling according to claim 1, and further comprising at least one spur inside of the second sleeve which initially holds said sliding body.

10. A push-in pipe coupling according to claim 1, wherein the striker is disposed inside of said second sleeve which is secured within the first sleeve.

11. A push-in pipe coupling according to claim 10, and further comprising at least one spur inside the second sleeve which initially holds said sliding body.

12. A push-in pipe coupling according to claim 11, wherein the at least one spur, the sliding body and the second sleeve are formed as a single integral piece.

13. A push-in pipe coupling according to claim 10, wherein said first sleeve has a recess and at least one component selected from the group consisting of said second sleeve, said clamping ring, a sealing ring and a thrust ring, is disposed in said recess within the first sleeve and is locked in the first sleeve by said fastener body.

14. A push-in pipe coupling according to claim 13, and further comprising an external thread on the first sleeve, wherein the fastener body is configured as a cap provided with an internal thread which mates with said external thread on the first sleeve.

15. A push-in pipe coupling according to claim 14, wherein the external thread on the first sleeve is divided into thread segments with gaps between them, and the internal thread of the fastener body is divided into corresponding thread segments and gaps, said fastener body being displaceable axially on the first sleeve such that the thread segments engage in the gaps of the fastener body and the threaded segments of the fastener body engage in the gaps of the first sleeve so that, by subsequent rotation of the fastener body, the thread segments of the first sleeve and the fastener body engage each other.

16. A push-in pipe coupling according to claim 14, wherein the first sleeve includes an associated detent groove and the fastener body is provided with at least one detent which, after the fastener body has been screwed onto the first sleeve, engages the associated detent groove of the first sleeve.

17. A push-in pipe coupling according to claim 13, wherein the fastener body is configured as a cap comprising at least one catch means for connection with the first sleeve.

18. A push-in pipe coupling according to claim 17, wherein said cap includes an arm and said at least one catch means is disposed on the arm of the cap.

19. A push-in pipe coupling according to claim 18, wherein said first sleeve includes a circumferential groove and said arm is one of a plurality of arms with catch means distributed circumferentially around the cap, said arms pointing radially inward and engaging the circumferential groove in the first sleeve.

20. A push-in pipe coupling according to claim 1, wherein the clamping ring is provided with at least one radially movable tongue, and further comprising a gripping tab provided on an inner end of the tongue, each tongue having on its external surface a nose which, when the fastener body is locked to the first sleeve, moves the tongue radially with respect to the first sleeve such that a positive joint with the end of the pipe is made by said gripping tab provided on the inner end of the tongue.

21. A push-in pipe coupling according to claim 20, wherein the clamping ring contains a slit and has a plurality of tongues with radially projecting noses distributed over the circumference.

22. A push-in pipe coupling according to claim 20, wherein the nose has a height which is coordinated with an inwardly lying gripping tab such that a positive connection is produced between the clamping ring and the end of the pipe.

23. A push-in pipe coupling according to claim 1, wherein the clamping ring has an abutment engaging said first sleeve to limit the axial movement of the clamping ring when the end of the pipe is inserted.

24. A push-in pipe coupling according to claim 1, and further comprising an abutment defined on said clamping ring engaging said first sleeve to limit axial movement of the clamping ring when the end of the pipe is inserted and substantially prevent any increase in resistance to insertion of the end of the pipe.

25. A push-in pipe coupling according to claim 1, wherein said detectable signal is a vibrational signal.

26. A push-in pipe coupling according to claim 1, and further comprising a detent defined on one of said first sleeve and said fastener body cooperating with a detent groove defined in the other of said first sleeve body and said fastener body to lock the fastener body on the first sleeve following rotation of said fastener body.

27. A push-in pipe coupling according to claim 1, wherein said sliding body is axially displaceable within [a] said second sleeve to the end thereof.

28. A push-in pipe coupling according to claim 1, and further comprising an abutment defined on said first sleeve and cooperating with said fastener body for limiting axial sliding of said fastener body onto said first sleeve.

* * * * *